July 15, 1958 K. WILFERT 2,843,419

SEALING TRANSVERSE WALL FOR AUTOMOBILES

Filed Nov. 9, 1954

INVENTOR

KARL WILFERT

BY Dicke & Craig

ATTORNEY

United States Patent Office 2,843,419
Patented July 15, 1958

2,843,419

SEALING TRANSVERSE WALL FOR AUTOMOBILES

Karl Wilfert, Stuttgart-Degerloch, Germany, assignor to Daimler-Benz Aktiengesellschaft, Stuttgart-Unterturkheim, Germany Application November 9, 1954, Serial No. 467,856

Claims priority, application Germany November 10, 1953

6 Claims. (Cl. 296—39)

The present invention relates to motor vehicles, and more particularly to a passenger car having its engine mounted adjacent to the passenger compartment and wherein the partition separating the latter from the engine compartment forms a double wall, the two parts of which are spaced a short distance from each other and one wall of which forms a separate element which is designed so that it may be installed in a car subsequent to its completion.

It is the primary object of the invention to provide the passenger compartment of a car with supplementary protecting means which, if desired, may also be installed in a used car, for shielding the passenger compartment from external influences, such as noise, dust, fuel vapors, and the like, which might enter it from the ends of the car adjacent the passenger compartment.

More particularly, it is the object of the invention thus to shield the passenger compartment of a car having the engine mounted in front, and to devise an improved and more effective protection of the passenger compartment relative to the compartment housing such front engine.

An essential feature of the invention consists in devising a supplementary partition which may be secured to the normal partition in a customary manner, to be free of any connection with any other parts of the vehicle, and particularly the side walls of the car body, and to extend at least over the surface of the other partition which closes off the adjacent passenger compartment.

It is another feature of the invention that the connecting elements for securing the supplementary partition to the normal, fixed partition pass through suitable openings in both walls, and that they, themselves, have longitudinal apertures or bores which simultaneously serve to pass rods, cables, or the like therethrough.

Another preferred feature of the invention consists in sealing the outer edge of the partition mounted on the side of the fixed partition remote from the passenger compartment, relative to the car body by means of an elastic packing or the like.

Further objects, features, and advantages of the present invention will become apparent from the following detailed description thereof and the accompanying drawings, in which Fig. 1 shows a longitudinal section through the front part of a passenger car provided with a double partition according to the invention;

Fig. 3 shows a longitudinal section similar to Fig. 1 through a modified embodiment of the invention;

Fig. 4 shows a cross section through the car taken along line IV—IV of Fig. 3; while

Figures 1, 2:
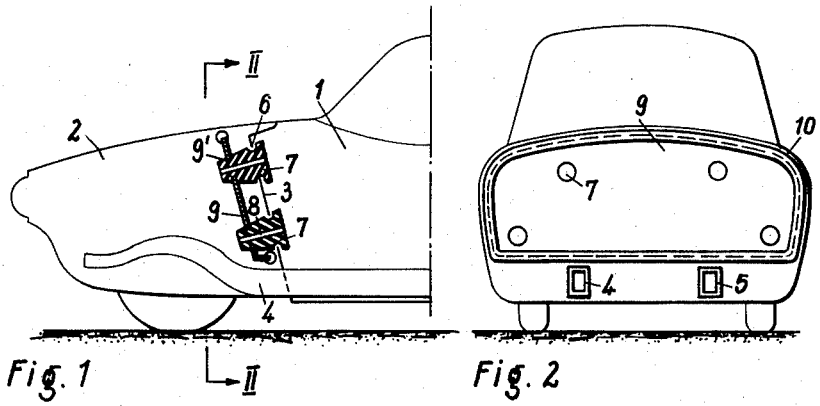
Fig. 2 shows a cross section through the car taken along line II—II of Fig. 1.

Referring to the drawings, Figs. 1 and 2 show an automobile with a passenger compartment 1 separated from the front engine compartment 2 by a partition 3. Above two long channel bars 4 and 5 of the chassis frame at each side of the central longitudinal plane of the car, the partition 3 has two openings 6 through each of which a connecting element 7 consisting of elastic material extends in a forward direction, being attached to the walls of said openings by annular grooves in the connecting element 7. The connecting elements 7 themselves are provided with axial bores 8 and together carry near their forward ends and parallel with the partition 3, a partition 9 snapped over annular grooves 9' and thus secured to the connecting elements 7. The partition 9 preferably made of a light insulating material extends downwardly to a line closely above the long channel bars 4 and 5 where it is bent outwardly toward the normal fixed wall 3. Along its periphery the partition 9 is also sealed relative to the vehicle body by means of an elastic packing 10 or the like.

Figures 3, 4:
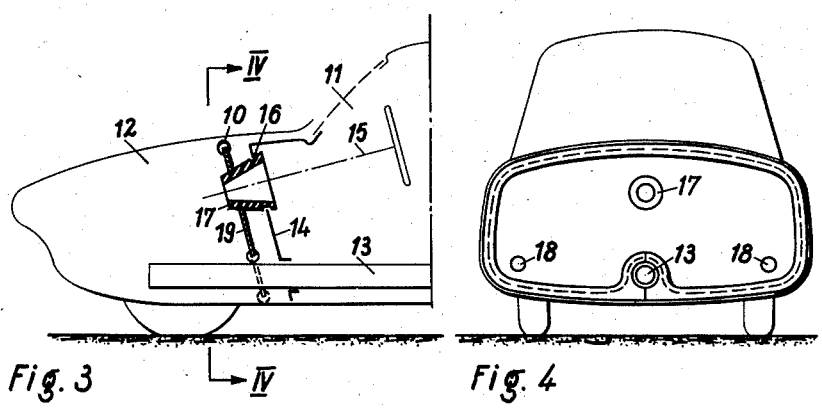

The modification of the invention shown in Figs. 3 and 4 illustrates the front part of an automobile designed according to the cellular construction or compartment system. The central cell or passenger compartment 11 and a forward compartment or front cell 12 are supported on the central tubular frame 13 of the car in any suitable manner not particularly shown. The front wall 14 of the central compartment 11 usually has at the point where the steering rod 15 passes through, a relatively large opening 16, and at each side thereof, approximately at the level of the car frame, a smaller opening, not particularly shown. In each of these openings a connecting element 17 or 18, respectively, is mounted, the element 17 being held in the opening 16 and simultaneously serving as a lead-in for the steering rod 15. The connecting elements 17 and 18 together carry at their front ends a second partition 19 which extends parallel to wall 14 and is sealed off toward the walls of the front compartment and toward the central tubular frame by an elastic packing 10 extending along the periphery of the partition 19. The connecting elements 17 and 18 are made of elastic material so that, apart from a more effective sealing action, the partition 19 thus connected with the central compartment 11 will be resiliently supported and not be affected by any movements of the two compartments or cells relative to each other.

As illustrated in the drawings the opposite openings in both partitions are preferably made of different sizes so as to facilitate the insertion of the connecting elements from the side of the partition having the larger opening.

Figure 5:
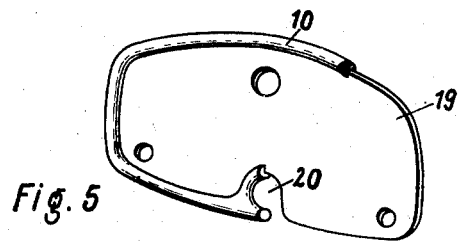
Fig. 5 is a perspective view of a supplementary partition similar to that shown in Figs. 3 and 4, but embodying a slight modification.

While the supplementary partitions 9 and 19 of both embodiments of the invention as described extend above the respective car frame or only bridge the same, it may be advisible for a better sealing to enclose the same entirely by portions of this additional partition. Fig. 5 indicates how the partition 19 may be provided with an elastic packing 10 which is made of annular shape at the opening 20 for receiving the central tubular frame 13 and tightly surrounding the same. As shown in Fig. 5, the packing 10 is then preferably divided adjacent the opening 20 so as to permit the partition 19 to be easily installed subsequently to the completion of the car or in a used car.

While the invention sets forth in detail what I regard as the preferred embodiments of my invention, it is to be understood that numerous changes may be made therein without departing from the spirit and scope of the invention as defined in the appended claims. For example, the partition sealing off the passenger compartment toward the rear may also be in the form of a double wall according to the invention, especially if the engine should be mounted in the rear.

Having thus described my invention, what I claim as new is:

1. A motor vehicle comprising a frame, a car body mounted on said frame including a passenger compartment, an engine, and a partition separating said passenger compartment from said engine, said partition comprising two separate and distinct individual walls, one of said separate and distinct individual walls forming a normally fixed part of said motor vehicle, the second wall forming a separate free and independent portable unit adapted to be separately installed in said motor vehicle and only on said fixed wall, said second of said separate and distinct individual walls being spaced a relatively small distance from said fixed wall and being substantially free of any rigid connection with any other parts of said motor vehicle including the walls of said car body, said second wall having large areas extending over the surface of said fixed wall in nontouching spaced apart relationship therewith, and resilient means comprising at least one elastic connecting element disposed between said separate and distinct individual spaced apart walls for securing said second wall to said fixed wall.

2. A motor vehicle comprising a frame, a car body mounted on said frame including a passenger compartment, and an engine, a partition separating said passenger compartment from said engine, said partition comprising two walls, one of said walls forming a normally fixed part of said vehicle, the second wall forming a separate unit adapted to be installed in said vehicle and on said fixed wall upon assembly of said vehicle, means for connecting said second wall to said fixed wall only and for spacing it a small distance therefrom substantially free of any rigid connection with any other parts of said vehicle including the walls of said car body, large portions of said second wall being spaced apart from and extending at least substantially over the surface of said fixed wall in nontouching relationship therewith, both of said walls being provided with openings, said connecting means passing through said openings and being in turn provided with longitudinal openings therein, and elements for operating said vehicle passing through said longitudinal openings in said connecting means.

3. A motor vehicle comprising a frame, a car body mounted on said frame including a passenger compartment, and an engine, a partition separating said passenger compartment from said engine, said partition comprising two walls, one of said walls forming a normally fixed part of said vehicle, the second wall forming a separate unit adapted to be installed in said vehicle and on said fixed wall upon complete assembly of said vehicle, means for connecting said second wall to said fixed wall and for spacing it a small distance therefrom substantially free of any rigid connection with any other parts of said vehicle including the walls of said car body, and extending at least substantially over the surface of said fixed wall, both of said walls being provided with openings, said connecting means passing through said openings and being in turn provided with longitudinal openings therein, elements for operating said vehicle passing through said longitudinal openings in said connecting means, and elastic means extending along the periphery of said second wall only in abutting, non-connected relationship with said vehicle body for sealing said second wall relative to said vehicle body.

4. A motor vehicle comprising a frame, a car body mounted on said frame including a passenger compartment, and an engine, a partition separating said passenger compartment from said engine, said partition comprising two walls, one of said walls forming a normally fixed part of said vehicle, the second wall forming a separate unit adapted to be installed in said vehicle and on said fixed wall upon complete assembly of said vehicle, means for connecting said second wall to said fixed wall and for spacing it a small distance therefrom substantially free of any rigid connection with any other parts of said vehicle including the walls of said car body, and extending at least substantially over the surface of said fixed wall, both of said walls being provided with openings, said connecting means passing through said openings and being in turn provided with longitudinal openings therein, elements for operating said vehicle passing through said longitudinal openings in said connecting means, and elastic means extending along the periphery of said second wall in abutting, non-connected relationship with said vehicle body and said frame for sealing said second wall relative to said vehicle body and said frame.

5. A motor vehicle comprising a frame, a car body mounted on said frame including separate adjacent passenger and engine cells, a wall separating said cells and forming a fixed part of one of said cells, means for mounting said cells on each other, and a separate wall adapted to be installed in said engine compartment, resilient means for securing said separate wall to said fixed wall only and for spacing it a small distance therefrom substantially free of any rigid connection with any other parts of said vehicle including the side walls of said engine unit and covering at least substantially the surface of said fixed wall, said fixed wall and said separate wall having coaxial openings, said resilient securing means passing through said openings, said resilient means in turn being provided with longitudinal openings therein, and elements for operating said vehicle passing through said longitudinal openings in said resilient means.

6. A motor vehicle comprising a frame, a car body mounted on said frame including separate adjacent passenger and engine units, a wall separating said units and forming a fixed part thereof, means for mounting said units on each other, and a separate wall adapted to be installed in said engine compartment, resilient means for securing said separate wall to said fixed wall and for spacing it a small distance therefrom substantially free of any connection with any other parts of said vehicle including the side walls of said engine unit and covering at least substantially the surface of said fixed wall, said fixed wall and said separate wall having coaxial openings, said resilient securing means passing through said openings, the openings in one of said walls being larger than the respective coaxial openings in the other so as to facilitate the insertion of said resilient means, said resilient means themselves having longitudinal openings therein, and elements for operating said vehicle passing through said longitudinal openings in said resilient means, and elastic means extending along the periphery of said separate wall for sealing the same relative to said vehicle body including said frame.

References Cited in the file of this patent

UNITED STATES PATENTS

| | | |
|---|---|---|
| 1,887,724 | Sieweck | Nov. 15, 1932 |
| 2,110,492 | Upson | Mar. 8, 1938 |
| 2,116,771 | Seaman | May 10, 1938 |
| 2,139,750 | Hicks | Dec. 13, 1938 |
| 2,250,510 | Van Buren | July 29, 1941 |

FOREIGN PATENTS

| | | |
|---|---|---|
| 378,453 | Great Britain | Aug. 11, 1932 |